United States Patent [19]

Liu

[11] Patent Number: 4,814,960
[45] Date of Patent: Mar. 21, 1989

[54] GLARE CONTROL

[76] Inventor: P. Dong-Guang Liu, P.O. Box 201, Newton Highlands, Mass. 02161

[21] Appl. No.: 863,114

[22] Filed: May 14, 1986

[51] Int. Cl.$^4$ .............................................. F21V 7/00
[52] U.S. Cl. ..................................... 362/307; 362/309; 362/311; 362/348; 313/116; 427/164; 350/320
[58] Field of Search ............... 362/309, 303, 304, 336, 362/326, 341, 348, 307, 311, 305, 343, 255; 350/431, 444, 165, 320, 276 R, 277; 313/116, 112; 427/164, 165, 168

[56] References Cited

U.S. PATENT DOCUMENTS

| | | | |
|---|---|---|---|
| 727,495 | 5/1903 | Todd | 313/116 |
| 1,230,670 | 6/1917 | Cassady | 362/309 |
| 1,917,612 | 7/1933 | Symmes | 362/303 |
| 1,926,732 | 9/1933 | North | 350/431 |
| 2,245,137 | 6/1941 | Spielholz | 313/116 |
| 2,280,489 | 4/1942 | Kallus | 313/116 |
| 3,490,982 | 1/1970 | Sauveniere et al. | 350/165 |
| 3,551,228 | 12/1970 | Meth | 350/320 |
| 3,909,649 | 9/1975 | Arsena | 313/112 |
| 4,114,983 | 9/1978 | Maffitt et al. | 350/276 R |
| 4,586,116 | 4/1986 | Kasboske | 362/303 |

FOREIGN PATENT DOCUMENTS 262898  12/1926  United Kingdom ............... 362/307

Primary Examiner—Ira S. Lazarus
Assistant Examiner—D. Cox

[57] ABSTRACT

Micro-irregularities on a surface that interacts with (transmits or reflects) illumination from a light source are effective to control glare perceived by a viewer in the light path projected from the source, while maintaining effective energy and directionality of the projected light. Preferably the micro-irregularities are created by liquid dispersion comprising organic polymeric particles and allowing the coating to dry.

9 Claims, 1 Drawing Sheet

GLARE CONTROL

BACKGROUND OF THE INVENTION

This invention relates to controlling glare from illumination devices that project illumination in a light path, such as headlights on automobiles, stadium lights, street lights, etc.

Many efforts have been made to reduce the discomfort caused by glare. In particular, blinding glare from on-coming or trailing automobile traffic and from street lighting poses a serious risk to automobile travel.

There are numerous other situations in which glare from lights causes discomfort or danger. For example, in a sports stadium lit for night use, glare from the lighting may interfere with good performance. Pilots may experience glare from airport landing lights or lights on other aircraft.

George U.S. Pat. No. 3,408,491 discloses an automobile headlight lens that includes cylindrical glass rods having an opaque wire positioned along the focal line of the rods to reduce glare to one side.

Cardone U.S. Pat. No. 3,402,981 discloses a glare-reduction screen for auto headlights having parallel, glare reducing horizontal veins spaced between a convex and a concave surface.

Meth U.S. Pat. No. 3,551,228 discloses a method of etching glass on a TV screen or picture glass to reduce reflected glare while minimizing loss of transparency. An HF-containing mixture is used to etch.

Tomforda U.S. Pat. No. 4,457,148 discloses a molded diffusion lens for an automobile headlight.

Bond U.S. Pat. No. 3,676,191 discloses an aerosol spray for applying a clear yellow dye to a headlight.

SUMMARY OF THE INVENTION

I have discovered that micro-irregularities on a surface that interacts with illumination from a light source are effective to control glare perceived by a viewer in the projected light path, while maintaining effective energy and directionality of the projected light. By the directionality of the projected light, I mean the focusing of illumination in a predetermined direction, such as the concentration of point-source illumination in a specific solid angle. The advantage of delivering light energy to a crucial location (e.g., the direction of automobile travel) is clear: greater illumination of the desired region with a less powerful light source. Surprisingly, when the illumination device is designed to concentrate projected light within a certain solid angle, the micro-irregularities maintain effective directionality. The micro-irregularities effectively disperse localized energy concentrations within the light path, while maintaining the light energy effective to illuminate the desired region. These characteristics are particularly advantageous for auto headlights, stadium lights, airport lights, street lights, etc., where high light energy is directed along a path to illuminate a desired subject, with the result that the surrounding area is dark creating high contrast conducive to viewer glare. Without being bound to any theory, it appears that localized high intensities within the light path most seriously contrast with surrounding light levels causing glare; evening out such localized intensities significantly reduces the perception of glare.

In one aspect, the invention features a method of reducing glare from a light source positioned to provide illumination that interacts with (i.e., is reflected by or transmitted through) an optical surface, by creating at the optical surface micro-irregularities adapted to control dispersion of illumination from the source projected in a light path. (For example, the micro-irregularities increase light diffusion by a factor of 500-99,500 where the solid angle of light reflected from the surface of glass is an index of 1.) Nevertheless, the micro-irregularities maintain effective directionality and average intensity of the projected light energy for its intended purpose of illuminating a specific field of view.

In preferred embodiments, the micro-irregularities are created by etching or by the process described below in the second aspect of the invention.

In a second aspect, the invention features controlling glare from a light source positioned to illuminate in a path interacting with an optical surface by coating the surface with a liquid dispersion comprising organic polymeric particles, and then allowing the coating to dry, so that a transparent, glare-reducing coating is formed at the surface having micro-irregularities that diffuse the light path, thereby reducing objectionable glare.

In a third aspect, the invention features a low-glare illumination device comprising a light source positioned to illuminate in a light path that interacts with an optical surface positioned in the path. The optical surface has micro-irregularities which maintain average intensity and directionality of illumination projected by the device, which retains effectiveness of illumination that would be projected without the micro-irregularities.

Finally, the invention features an automobile headlight having a coating of polymeric micro-irregularities as described above. Preferably the optical surface is a mirror behind the light source, the outer surface of a sealed bulb, or a surface (front or back) of a lens which directs illumination from a light source positioned behind the lens.

In preferred embodiments of either of the above glare-reducing methods or illumination devices, the light source is a bulb, and the dispersion is applied either to the bulb itself, or to a transparent cover (e.g., a lens) or mirror that directs illumination from the bulb. Preferably the light source is an automobile headlight, a street light, a light on an aircraft landing field designed to guide aircraft during landing or take-off, or a stadium light source positioned and designed to illuminate a stadium.

Also in preferred embodiments, the liquid dispersion includes an organic polymer-containing liquid selected from:

(1) dispersions containing latices;
(2) varnishes;
(3) polyurethane dispersions;
(4) lacquers;
(5) co-reactable systems; or
(6) condensing systems.

A flattening agent is included in the dispersion, preferably selected from cellite, magnesium carbonate, alumina hydrate, wax, aluminum stearate, zinc tungate, silica and zinc stearate.

The invention provides a durable, glare-reducing coating that surprisingly does not seriously interfere with illumination from the light source. The viewer's perception of glare is reduced, because the viewer is not subjected to intense "hot-spots" projected directly from the source. At the same time, the effectiveness of the directionality and intensity of illumination is unimpaired. Specifically, the invention provides significantly less glare to on-coming automobiles, without seriously reducing the distance of headlight illumination.

Other features and advantages of the invention will be apparent from the following description of preferred embodiments and from the claims.

DESCRIPTION OF THE PREFERRED EMBODIMENT

I first briefly describe the drawings illustrating a particularly preferred embodiment of the invention.

Figure 1:
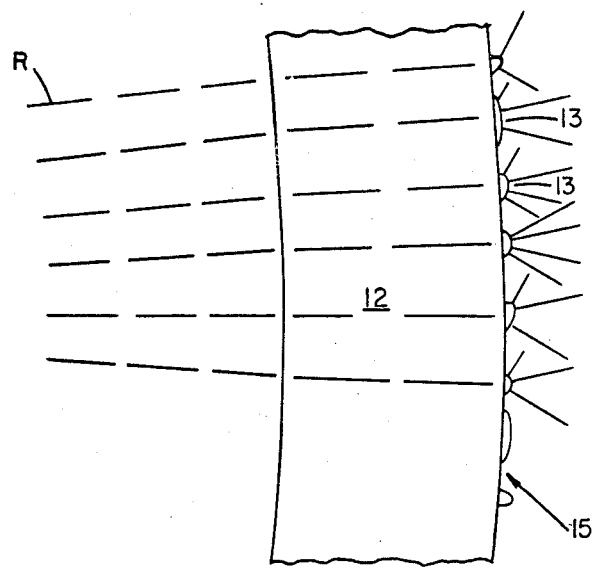
FIG. 1 is a highly diagrammatic representation of the anti-reflective surface demonstrating surface irregularities on a headlight.

The invention will be described with reference to specific examples of automobile headlights.

Any standard auto headlight can be used, including sealed beam headlights and bulb-type headlights. For sealed beam headlights, the coating is applied to the exterior surface of the headlight. For bulb-type headlights, the coating may be applied either to the bulb or to the lens that directs illumination from the bulb. Also the coating may be applied to a mirrored lens behind the light source.

Headlights are designed with a variety of optical focusing elements that project illumination in a desired direction, to cover a desired area. Various manufacturers use somewhat different optics, yielding somewhat different solid angles of projected illumination. The micro-irregularities preserve the directionality of the particular light-projecting optics of the underlying headlight.

Any of a great variety of polymer-containing liquid dispersions can be used in the coating formulation. Latices which can be used include:

(a) acrylate;
(b) butadiene copolymers such as butadiene acrylonitrile or butadiene styrene;
(c) polystyrene;
(d) vinyl chloride;
(e) vinylidene chloride-acrylonitrile; and
(f) vinyl pyridine.

Preferred varnishes are acid and alkali resistant and waterproof. Various polyurethanes that are preferred include co-reactable polyurethanes, moisture-cured polyurethanes, and urethanes produced from aliphatic or aromatic isocyanates. Epoxies that can be used include co-reactable epoxy-amines, epoxy-polyamides, and coal tar-epoxy. Condensing substances such as epoxy phenolics, epoxy powder and baked phenolics also can be used.

Finally, various other liquid dispersions used include:
(a) alkyd;
(b) silicone;
(c) acrylic;
(d) polyester;
(e) phenoplasts;
(f) polytetrafluoroethylene;
(g) nylon;
(h) cellulose esters and ethers;
(i) amino resins; and
(j) copolymers of ethylene or propylene.

Suitable resins for coatings are referenced in numerous sources known to those in the field, including sources listed in the *Modern Plastics Encyclopedia* 1983-1984, McGraw Hill, N.Y., N.Y. or in Kirk-Othmer *Encyclopedia of Chemical Technology*, published 1978, John Wiley & Sons, New York.

Preferably the dispersion is a polyurethane dispersion that includes a flattening agent. For example, aromatic isocyanate with flattening agent.

Another specific dispersion that can be used is the acrylic, polyvinyl acetate (PVA) dispersion described in my U.S. Pat. No. 4,582,761, which is hereby incorporated by reference.

The dispersion may be coated on the surface with any suitable applicating device such as a brush, spray or sponge. If carefully applied and allowed to dry, it forms a durable, non-glare coating that does not interrupt transmission of light from the object being viewed.

In particular, in assembly line operations, the dispersion can be applied by dipping the headlight lens or bulb into the dispersion or it can be sprayed onto the headlight surface.

One particular coating formulation is as follows, mixed in a 40:60 ratio with hydrocarbons:
 linseed oil
 toluene diisocyanate
 silicate (as a flattening agent).

Alternatively, a glass surface may be subjected to a controlled etch, such as with hydrofluoric acid, to create the desired micro-irregularities. Specific etches include $HF/H_2SO_4$ in a glycerine solution to smooth pits. The surface can be polished, e.g., with fine $Al_2O_3$. The duration of the etch is short (10-30 seconds), and resulting etched surface is not frosted, because frosting would reduce illumination too much. Suitable etching techniques are described in the following U.S. Pat. Nos. which are incorporated by reference: 3,551,228; 3,490,982; 3,489,624.

Finally, control over the degree of micro-irregularity, and therefore the amount of dispersion can be achieved by applying an inert coating over the irregularities and removing the coating until only a desired amount of irregularity protrudes through the coating. The technique generally described in my U.S. Pat. No. 4,604,297 (hereby incorporated by reference) is suitable for this purpose.

The effect of the dispersion is illustrated by the figures. FIG. 1 shows a segment of the external lens 12 of a sealed beam type headlight. Dispersion coating 15 has been applied to the front surface of exterior lens 12, leaving micro-irregularities 13 which enhance diffusion by a factor of 500-99,500, most preferably 1,000-40,000, measured with respect to an arbitrary reference of 1, which is the solid angle of light reflected from a glass surface. As shown in FIG. 1, rays R are defracted by the irregularities.

Figure 2:
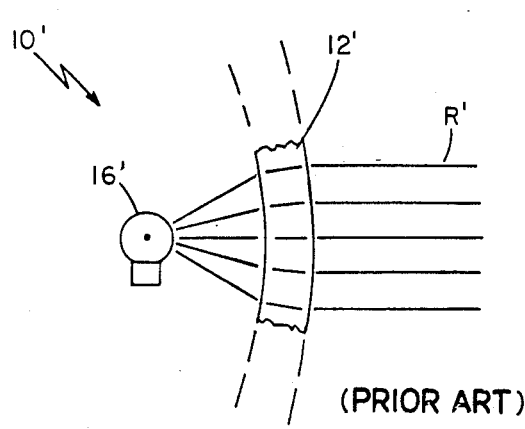
FIG. 2 is a highly diagrammatic representation of a prior art headlight.

FIG. 2 shows the effect of glare from an unmodified headlight 10', having a lens 12' to direct parallel rays R' from the incandescent filament 16'. The viewer perceives direct rays, with a dark background, causing maximum glare.

Figure 3:
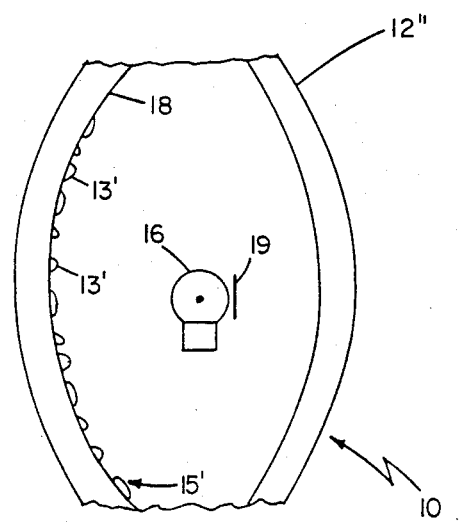
FIG. 3 is a highly diagrammatic representation of a headlight demonstrating surface irregularities on a focusing mirror.

FIG. 3 shows the effect of the micro-irregularities 13' on a reflective surface 18 positioned behind light source 16. A reflector 19 in front of source 16 prevents light from exiting directly from source 16 through lens 12". Accordingly, light transmitted through lens 12" has been first focused and diffused by reflector 18.

Other embodiments are within the following claims.

I claim:

1. A method of reducing glare from an illumination device comprising a light source positioned to provide illumination that interacts with an optical glass surface, said device providing illumination projected in a light path, said method comprising, by controlled etching of said glass, creating over all of said optical glass surface, micro-irregularities to control dispersion of said projected illumination, said micro-irregularities effectively maintaining the directionality and average intensity of the projected illumination.

2. The method of claim 1 wherein said micro-irregularities are effective to increase light diffusion at said surface by a factor of 500–99,500.

3. The method of claim 1 wherein said micro-irregularities substantially maintain the solid angle of said directed illumination.

4. The method of claim 1 wherein said illumination device comprises a light bulb, and said optical surface is the exterior bulb surface.

5. The method of claim 1 wherein said illumination device comprises a light bulb, and said optical surface is a lens or mirror directing illumination from said bulb in said light path.

6. The method of claim 1 wherein said illumination device is an automobile headlight.

7. The method of claim 1 wherein said illumination device is light source is positioned and designed to illuminate a stadium or a street.

8. The method of claim 1 wherein said illumination device is light source is positioned on an aircraft landing field designed to guide aircraft during landing or take-off.

9. The method of claim 1 wherein the micro-irregularities are created, and an inert coating is applied over the micro-irregularities and subsequently removed to control the amount of dispersion achieved.

* * * * *

UNITED STATES PATENT AND TRADEMARK OFFICE
CERTIFICATE OF CORRECTION

PATENT NO. : 4,814,960
DATED : March 21, 1989
INVENTOR(S) : P. Dong-Guang Liu

It is certified that error appears in the above-identified patent and that said Letters Patent is hereby corrected as shown below:

Column 6, line 11, change "is light source is positioned" to --is a light source positioned--.

Column 6, line 14, change "is light source is positioned" to --is a light source positioned--.

Signed and Sealed this

Seventh Day of August, 1990

Attest:

HARRY F. MANBECK, JR.

*Attesting Officer*  *Commissioner of Patents and Trademarks*